(12) United States Patent
Huang et al.

(10) Patent No.: US 8,505,584 B2
(45) Date of Patent: Aug. 13, 2013

(54) STRUCTURE OF WATER-SAVING DEVICE

(75) Inventors: Jian-ke Huang, Xiamen (CN);
Sheng-chao Dai, Xiamen (CN);
Sheng-jun Du, Xiamen (CN)

(73) Assignee: Xiamen Runner Industrial Corporation, Xiamen (CN)

( * ) Notice: Subject to any disclaimer, the term of this patent is extended or adjusted under 35 U.S.C. 154(b) by 23 days.

(21) Appl. No.: 13/280,300

(22) Filed: Oct. 24, 2011

(65) Prior Publication Data
US 2012/0222754 A1  Sep. 6, 2012

(30) Foreign Application Priority Data

Mar. 1, 2011 (CN) .................... 2011 2 0051414 U

(51) Int. Cl.
*F15D 1/02* (2006.01)
(52) U.S. Cl.
USPC .............................................. 138/43; 138/46
(58) Field of Classification Search
USPC ....................................... 138/43, 46
See application file for complete search history.

(56) References Cited

U.S. PATENT DOCUMENTS

| | | | | | |
|---|---|---|---|---|---|
| 3,298,394 | A | * | 1/1967 | Chorkey ....................... | 137/860 |
| 4,000,857 | A | * | 1/1977 | Moen ........................... | 239/428.5 |
| 4,562,960 | A | * | 1/1986 | Marty et al. ................. | 239/72 |
| 6,571,831 | B1 | * | 6/2003 | Hart ............................. | 138/46 |
| 8,230,884 | B2 | * | 7/2012 | Bereznai ...................... | 138/46 |
| 2008/0277010 | A1 | * | 11/2008 | Zoller .......................... | 138/43 |

\* cited by examiner

*Primary Examiner* — James Hook
(74) *Attorney, Agent, or Firm* — Chun-Ming Shih

(57) ABSTRACT

A structure of water-saving device includes a base, an adjusting ring and a gland. The adjusting ring is mounted in a water-inlet channel. The gland is movably positioned in the base to limit the adjusting ring. A central part of a top surface of the gland sinks downward to form a recess. When water flow impacts the gland, the gland pushes the adjusting ring, such that the adjusting ring is deformed. Since a difference of pressure occurs between a top and bottom surfaces of the gland, the larger the water pressure is, the larger the force from the gland toward the adjusting ring becomes; thus the degree of deformation of the adjusting ring also becomes large, such that the area between the adjusting ring and the bottom surface of the base for water flowing through decreases and the flow of water gradually achieves a stable value.

2 Claims, 3 Drawing Sheets

STRUCTURE OF WATER-SAVING DEVICE

BACKGROUND OF THE INVENTION

1. Field of the Invention

The present invention is related to an element of shower equipment, in particular to a structure of a water-saving device, which is adapted for various water discharge devices to control the water-discharge capacity.

2. Description of Related Art

Scarce water resource is an essential issue all over the world. Saving water in our daily lives is a topic of environmental protection required to be promoted. In public space, people usually turn the tap up more for their convenience. In fact, only 20% of the water flow achieves cleaning function while the remaining 80% of it are waste. Therefore, in order to achieve the goal of saving water, it is necessary to install a device for compulsorily saving water, such that to actively control the water-discharge capacity can be achieved.

SUMMARY OF THE INVENTION

The objective of the present invention is to provide a structure of a water-saving device, which is able to control the water-discharge capacity, such that the goal of saving water can be achieved.

To achieve the objective, the solution of the present invention is to provide:

a structure of water-saving device, comprising a base, an adjusting ring and a gland. The base has an inlet channel. The adjusting ring is mounted in the water-inlet channel. The gland is movably positioned in the base to limit the adjusting ring in the base. The adjusting ring is made of a soft deformable material.

Said base is a pillar body and a central part of its bottom surface forms a socket to limit the gland. Multiple inlet holes are arranged on the bottom surface surrounding the socket. Multiple ribs are further arranged on the bottom surface surrounding the inlet holes and the location of each rib corresponds to a middle of two inlet holes. The inlet channel being communicated with each inlet hole is formed between each two adjacent ribs. The base has a protruding plate, which protrudes from an inner wall near the top of the base. The protruding plate has a curved guiding surface. The gland is a cover in a ladder form; that is, its top forms a lid. The outer diameter of the lid is approximately larger than the inner diameter of said protruding plate. The central part of a lower surface of the lid sinks downward to form a sinking column. The outer edge of the lid has multiple through holes being staggered with the inlet holes. The adjusting ring is a soft ring having an outer diameter smaller than the inner diameter of a chamber in a lower portion of the base and larger than or equal to the outer diameter of the sinking column of the gland.

A central part of the sinking column is elongated downward to form a guiding protrusion.

A central part of a top surface of the gland sinks downward to form a recess.

After using the aforementioned means, the present invention uses a movable gland corresponding to the base and a soft adjusting ring mounted between the gland and the inlet channel of the base. When a water flow impacts the gland, the gland pushes the adjusting ring, such that the adjusting ring is deformed. Since a difference of pressure occurs between a top surface and a bottom surface of the gland, the larger the water pressure is, the larger the force from the gland toward the adjusting ring becomes; and thus the degree of deformation of the adjusting ring also becomes large, such that the area between the adjusting ring and the bottom surface of the base for water flowing through decreases and the flow of water gradually achieves a stable value. Therefore, the function of saving water and limiting water flow is able to be achieved.

Furthermore, the gland with the recess formed downward from a central part of the gland presses the adjusting ring and thus it deforms. The recess ensures that the force applied to the gland concentrates; therefore, it applies pressure more evenly on the adjusting ring and simultaneously the adjusting ring also deforms evenly. Accordingly, water flow can be controlled better and its performance can be guaranteed.

BRIEF DESCRIPTION OF THE DRAWINGS

The invention, as well as its many advantages, may be further understood by the following detailed description and drawings in which.

DETAILED DESCRIPTION OF THE INVENTION

As shown in FIGS. 1 to 6, the present invention discloses a structure of water-saving device. It is fastened to a water-input pipe of a water discharge device. The structure of water-saving device comprises a base 1, an adjusting ring 2 and a gland 3. The base 1 has an inlet channel. The adjusting ring 2 is mounted in the water-inlet channel and is positioned in the base 1 through the movable gland 3. The adjusting ring 2 is made of a soft deformable material. It is characterized in that it is deformable with the dimension of the pressure from the gland 3.

Figure 5:
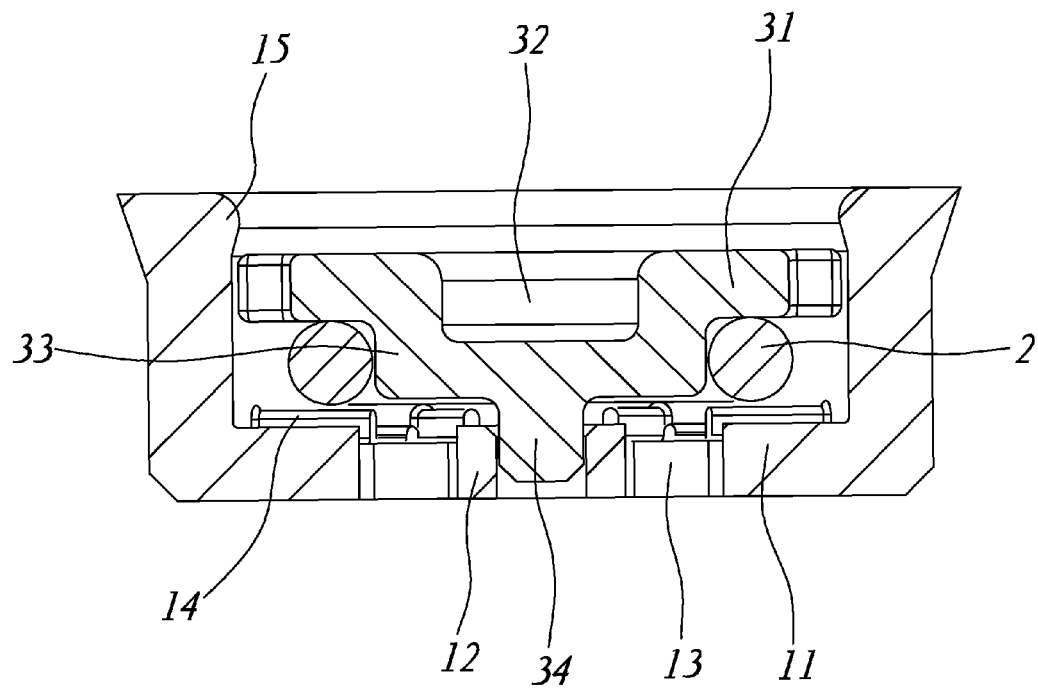
FIG. 5 is an illustrative perspective view of a base of a water-saving device of the present invention.

As shown in FIG. 5, the base 1 is a pillar body and a central part of its bottom surface 11 forms a socket 12 to limit the gland 3. Multiple inlet holes 13 are arranged on the bottom surface 11 surrounding the socket 12. Multiple ribs 14 are further arranged on the bottom surface 11 surrounding the inlet holes 13 and the location of each rib 14 corresponds to a middle of two inlet holes 13. The inlet channel being communicated with each inlet hole 13 is formed between each two adjacent ribs 14. The base 1 has a protruding plate 15, which protrudes from an inner wall near the top of the base 1. The protruding plate 15 has a curved guiding surface.

Figure 6:
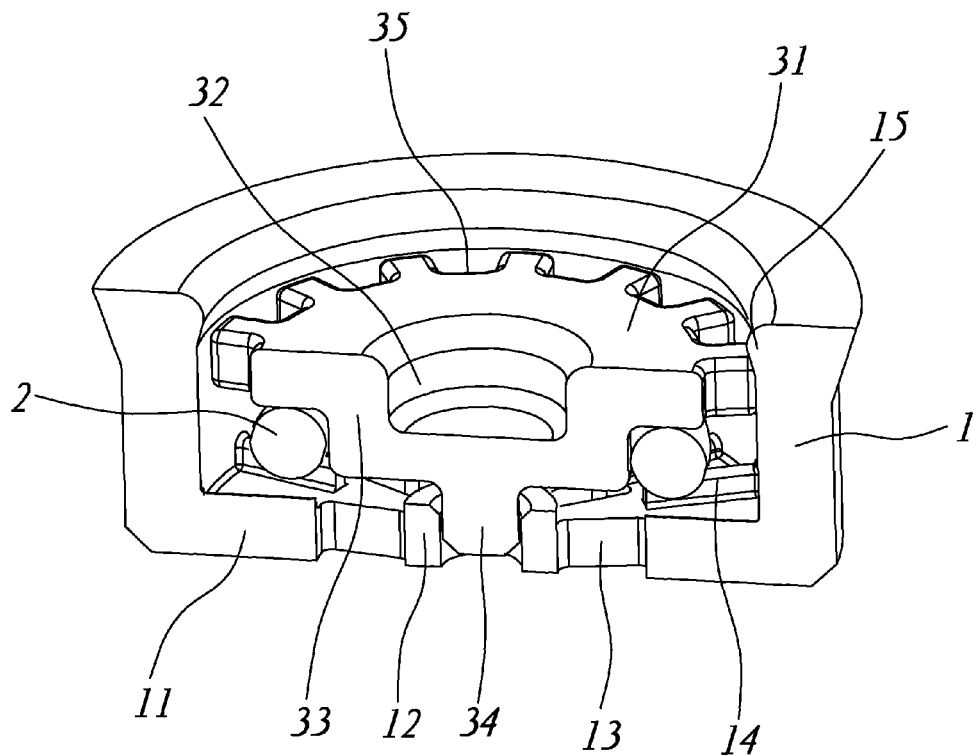
FIG. 6 is an illustrative perspective view of a gland of a water-saving device of the present invention.

As shown in FIG. 6, the gland 3 is a cover in a ladder form; that is, its top forms a lid 31. The outer diameter of the lid 31 is approximately larger than the inner diameter of said protruding plate 15. A central part of a top surface of the lid 31 sinks downward to form a recess 32. A central part of a lower surface of the lid 31 sinks downward to form a sinking column 33. A central part of the sinking column 33 is elongated downward to form a guiding protrusion 34. The outer edge of the lid 31 has multiple through holes 35 being staggered with the inlet holes 13.

The adjusting ring 2 is a soft ring having an outer diameter smaller than the inner diameter of a chamber in a lower portion of the base 1 and larger than or equal to the outer diameter of the sinking column 33 of the gland 3.

Figure 1:
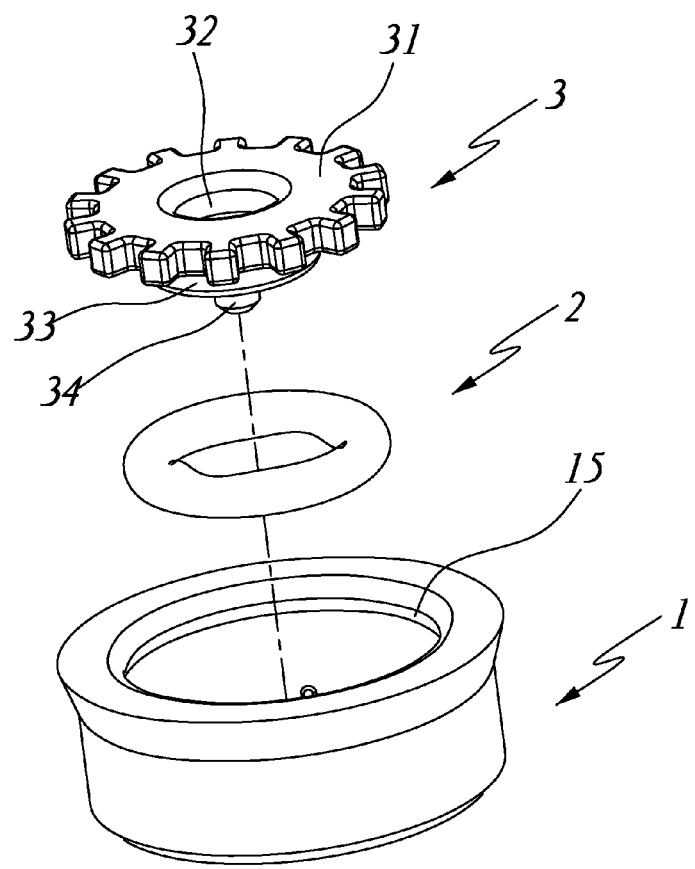
FIG. 1 is an exploded perspective view of the present invention.
Figure 2:
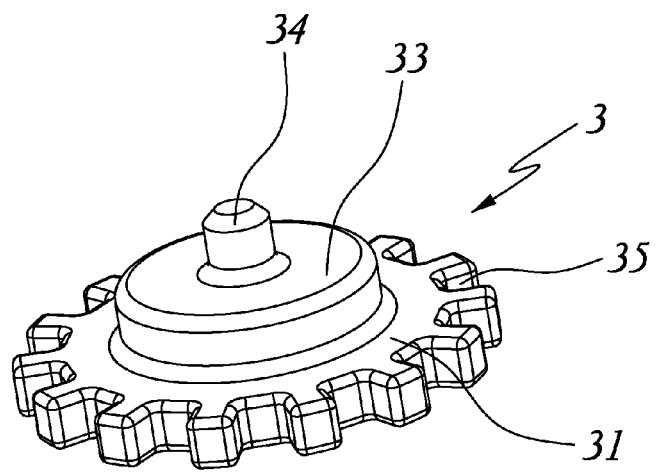
FIG. 2 is a perspective view of the present invention.
Figure 3:
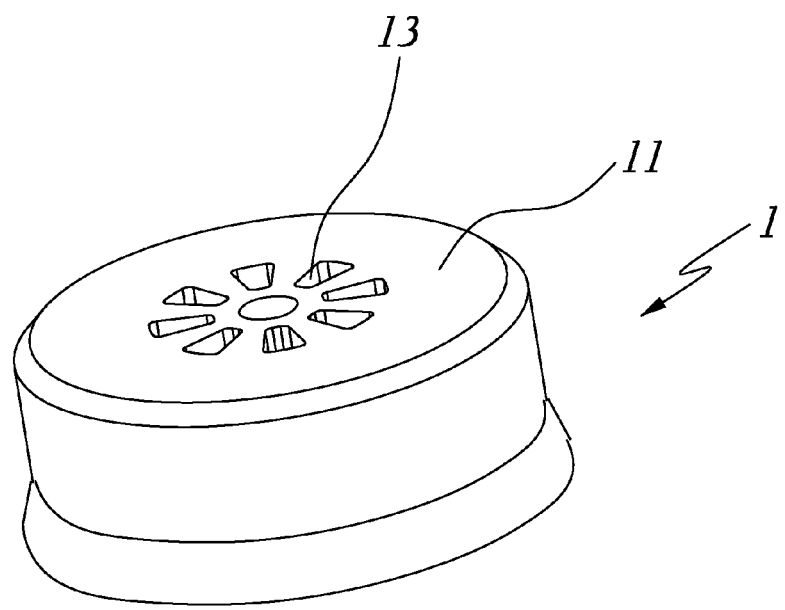
FIG. 3 is a sectional side view of the present invention.
Figure 4:
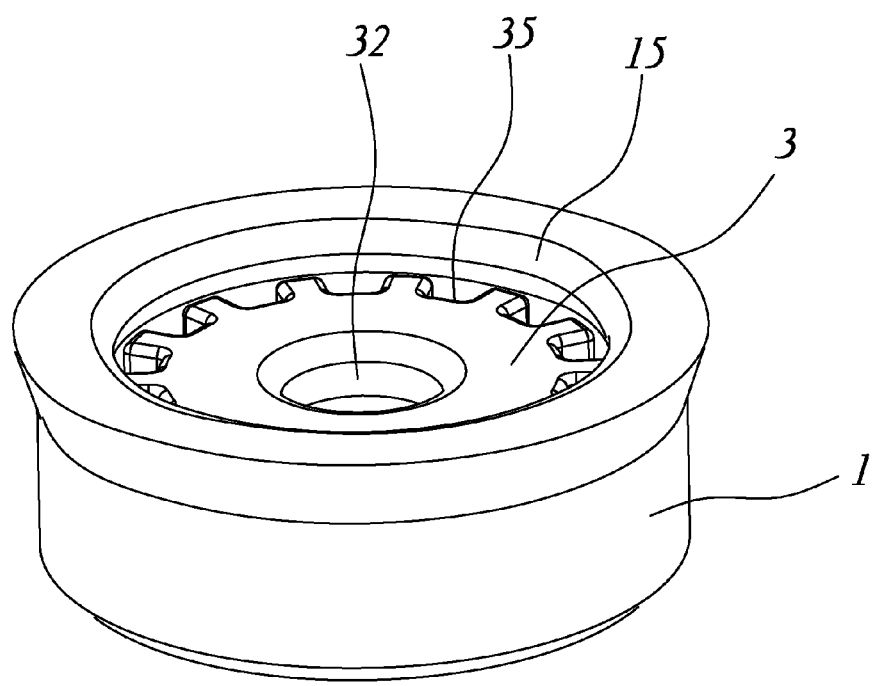
FIG. 4 is a sectional perspective view.

As shown in FIGS. 2, 3 and 4, when being assembled, the ring 2 is mounted around the sinking column 33 of the gland 3 and it is mounted in the base 1 with the sinking column 33.

When the lid 31 of gland 3 is subject to force, the lid 31 slides through the protruding plate 15 with the curved guiding surface and is engaged in a location lower than the protruding plate 15, which limits the lid 31. Simultaneously, the adjusting ring 2 is positioned in the base 1 and the adjusting ring 2 is just located between the lid 31 of the gland 3 and the ribs 14 of the base 1. In such way, a water-saving device is formed.

When the present invention is in a normal situation, the adjusting ring 2 of the water-saving device is located in normal situation and at that time, the gap for water flow is lager.

When a water discharge device is switched on, a water flow impacts the gland 3. Therefore, the gland 3 pushes the adjusting ring 2, such that the adjusting ring 2 will be deformed. Since a difference of pressure occurs between a top surface and a bottom surface of the lid 31 of the gland 3, the larger the water pressure is, and the larger the force from the gland 3 toward the adjusting ring 2 becomes; and such that the degree of deformation of the adjusting ring 2 also becomes large, such that the area between the adjusting ring 2 and the bottom surface 11 of the base 1 for water flowing through decreases and the flow of water will gradually achieve a stable value. Therefore, the function of saving water and limiting water flow is able to be achieved. The gland 3 with a recess 32 formed downward from the central part of the gland 3 presses the adjusting ring 2 and thus it deforms. The recess 32 ensures that the force applied to the gland 3 concentrates; therefore, it applies pressure more evenly on the adjusting ring 2 and simultaneously the adjusting ring 2 also deforms evenly. Accordingly, water flow can be controlled better and its performance can be guaranteed.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A structure of water-saving device, comprising a base, an adjusting ring and a gland; the base having an inlet channel; the adjusting ring being mounted in the inlet channel; the gland being movably positioned in the base to limit the adjusting ring in the base; and the adjusting ring being made of a soft deformable material, wherein a central part of a bottom surface of the base forms a socket to limit the gland;

multiple inlet holes are arranged on the bottom surface of the base to surround the socket;

multiple ribs are further protruded on the bottom surface of the base to surround the inlet holes and the location of each rib corresponds to a middle of two inlet holes; the base has a protruding plate which protrudes from an inner wall near the top of the base; the protruding plate has a curved guiding surface; the gland has its top forms a lid; a central part of a top surface of the lid sinks downward to form a recess; a central part of a lower surface of the lid sinks downward to form a sinking column; a central part of the sinking column is elongated downward to form a guiding protrusion to be received within the socket, as such, when being assembled, the adjusting ring is mounted around the sinking column of the gland and the adjusting ring is mounted in the base with the sinking column;

when the lid of gland is subject to be forced, the lid slides through the protruding plate with the curved guiding surface and is engaged in a location lower than the protruding plate, which limits the lid, simultaneously, the adjusting ring positioned on the ribs is lust located between the lid of the gland and the ribs of the base.

2. The structure of the water-saving device as claimed in claim 1, wherein the base is a pillar body; the inlet channel being communicated with each inlet hole is formed between each two adjacent ribs; the gland is a cover in a ladder form; the outer diameter of the lid is approximately larger than the inner diameter of said protruding plate; the outer plate of the lid has multiple through holes being staggered with the inlet holes; the adjusting ring is a soft ring having an outer diameter smaller than the inner diameter of a chamber in a lower portion of the base and larger than or equal to the outer diameter of the sinking column of the gland.

* * * * *